Figure 1:
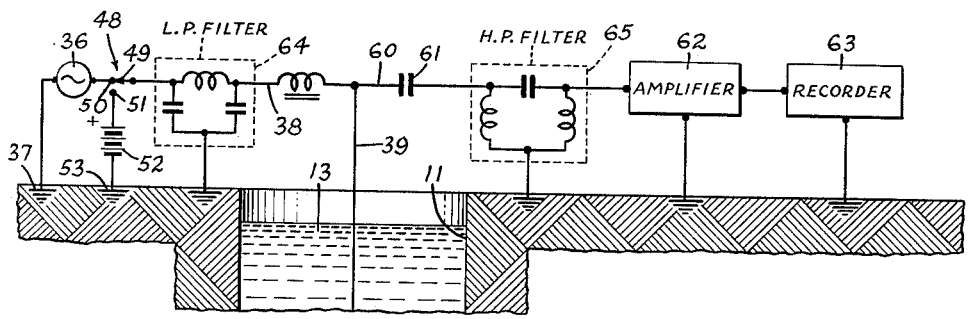

April 6, 1954      F. S. PHILLIPS      2,674,699

RADIOACTIVITY DETECTING APPARATUS

Filed Feb. 11, 1950

INVENTOR.
FLOYD S. PHILLIPS
BY
*Campbell, Brumbaugh, Free & Graves*
HIS ATTORNEYS.

Patented Apr. 6, 1954

2,674,699

UNITED STATES PATENT OFFICE 2,674,699

RADIOACTIVITY DETECTING APPARATUS

Floyd S. Phillips, Houston, Tex., assignor to Schlumberger Well Surveying Corporation, Houston, Tex., a corporation of Delaware Application February 11, 1950, Serial No. 143,629

10 Claims. (Cl. 250—83.6)

The present invention relates to devices for detecting radioactivity and more specifically to new and improved radioactivity detecting apparatus in which one or more of a plurality of radioactivity detectors may be made operable to detect radioactivity in a novel and highly effective manner.

More specifically, the invention has to do with new and improved radioactivity detecting apparatus of the above character which is of special utility in relatively inaccessible places such as bore holes drilled into the earth, for example, although it is not limited to such uses.

It has been proposed, heretofore, to log the radioactivity of earth formations surrounding a bore hole by lowering relatively short and relatively long radiation detectors simultaneously in a common housing into the bore hole and recording at the surface the response of one or both of the detectors. The shorter detector has the greater resolving power so that it provides a relatively detailed log of radioactivity which shows relatively thin strata. Its sensitivity is low, however, so that the apparatus must be moved through the bore hole at a relatively low velocity while the log is being made. Where a detailed log is not necessary, the output from the longer detector, or from both detectors is logged. Since the longer detector is more sensitive, the apparatus can be moved through the bore hole at a relatively high velocity during this logging operation. Thus, the apparatus is capable of producing a correlation log at a relatively great velocity, yet enables a detailed log of thin formations to be obtained when desired.

For maximum detector size, as required for maximum sensitivity, within a housing small enough to pass readily through a bore hole, the detectors must be snugly fitted one above another in the housing. The conductors required for connecting the detector to apparatus on the other side of the other detector in the housing, therefore, cannot readily be placed between said other detector and the housing. Accordingly, said other detector must be provided with a tube or conduit extending through its active length through which conductors may pass to the other detector. It is, therefore, very expensive and difficult to manufacture, and, even when manufactured with great care, it is apt to become unstable in operation.

It is an object of the invention, accordingly, to provide new and improved radioactivity detecting apparatus in which one or more of a plurality of radiation detectors may be made operable to detect radiation, as desired, in a novel and highly effective manner.

Another object of the invention is to provide new and improved radioactivity detecting apparatus of the above character in which radioactivity may be detected selectively with detectors of different sensitivities.

A further object of the invention is to provide new and improved radioactivity detecting apparatus of the above character which is capable of use in relatively inaccessible places such as bore holes drilled into the earth, for example, and which may be controlled in a simple and effective manner from a remote location such as the surface of the earth, for example.

Still another object of the invention is to provide new and improved radioactivity detecting apparatus of the above character in which a single control circuit may be employed to control the operation of a plurality of radiation detectors.

These and other objects of the invention are attained by providing radioactivity detecting apparatus comprising a plurality of radiation detectors each having cathode means and anode means mounted in an evacuated envelope. The several detectors are suitably designed so that the respective anode potentials at which they become operative as radiation detectors are different and the anode means of the detectors are connected in series to an adjustable source of anode potential. With this construction, one or more detectors may be rendered operative selectively to detect radiation by proper adjustment of the anode potential provided by the source.

In a preferred embodiment designed for use in inaccessible places such as bore holes drilled into the earth, for example, the detectors may be mounted in longitudinally spaced apart relation in a housing adapted to be lowered into a bore hole. The anode means of the detectors are connected in series and means may be provided for controlling from a relatively remote point such as the surface of the earth, for example, the potential applied to the anode means circuit, thereby to render one or more of the detectors effective to detect radiation as desired.

Figure 2:
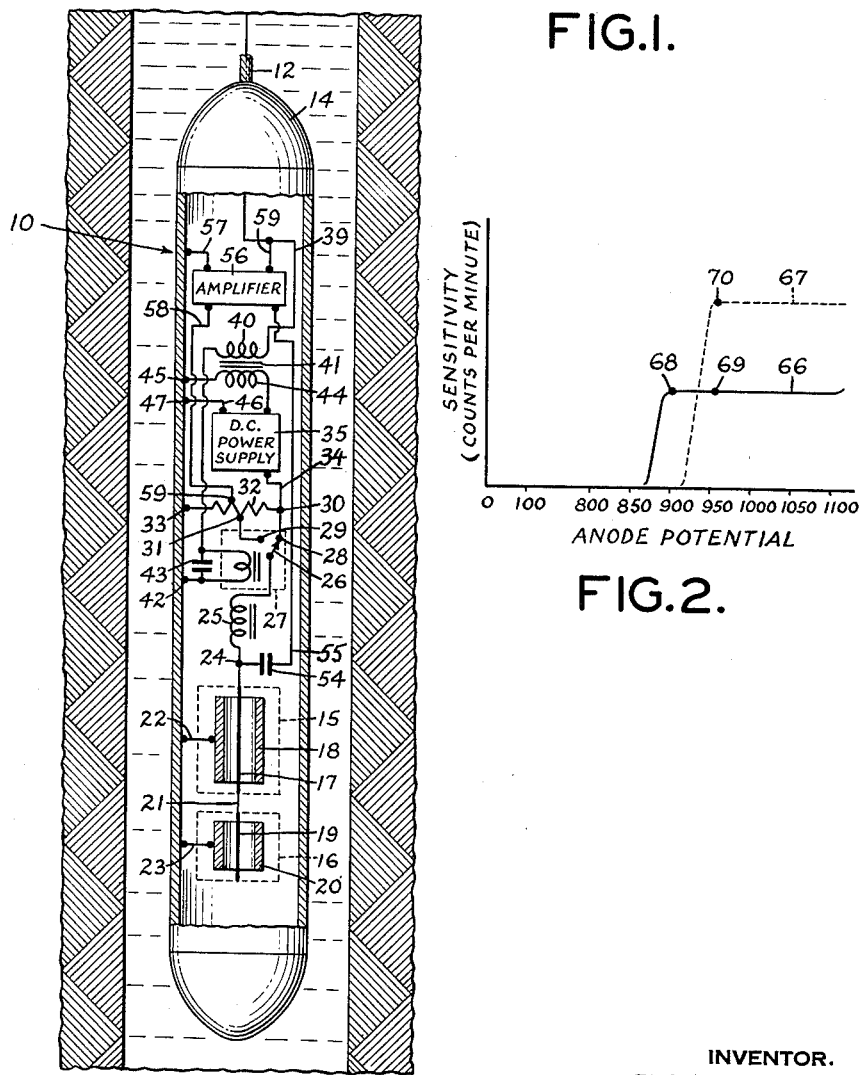
Figure 2:
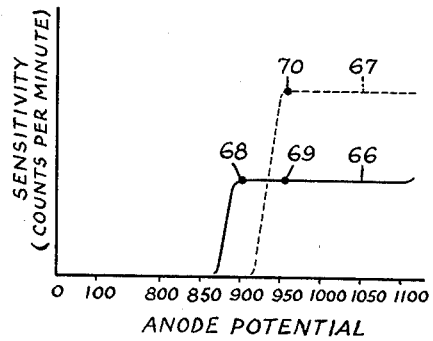

Additional objects and advantages of the invention will be apparent from the following detailed description of a representative embodiment, taken in conjunction with the accompanying drawings in which:

Fig. 1 illustrates schematically typical radioactivity detecting apparatus constructed according to the invention and adapted for use in a bore hole drilled into the earth; and Fig. 2 is a graph illustrating typical operating characteristics for the detectors used in the apparatus shown in Fig. 1.

For purposes of illustration, a typical embodiment of the invention adapted for use in a bore hole drilled into the earth is shown in Fig. 1 and is described in detail below. In Fig. 1, a radioactivity detecting apparatus 10 is adapted to be raised and lowered through a bore hole 11 by means of a supporting cable 12 and winch (not shown), as is well known in the art. The bore hole 11 generally contains a conducting fluid 13 such as drilling mud, for example, and may also have a metallic casing (not shown) inserted therein.

The detecting apparatus 10 may comprise a waterproof pressure-resistant housing 14, preferably made of suitable conducting material so as to provide an electrical ground return from the electronic equipment contained therein through the bore hole fluid 13 and surrounding earth formations to the surface equipment. Of course, an additional conductor can be provided in the cable 12 to serve as a ground return, if desired, in which case the housing 14 may be made of any suitable material.

Mounted one above the other in the housing 14 and snugly fitted therein are a pair of radiation detectors 15 and 16 which may be of the type known in the art as Geiger-Mueller counters. The detector 16 may comprise, for example, a central anode 19 and a coaxial cathode 20 of substantially cylindrical shape disposed in an evacuated envelope containing gas at a suitable pressure. According to the usual practice, the detector 16 is made relatively short so as to enable it to provide a relatively finely detailed log of radioactivity which will show relatively thin formations. Because of its short length, however, its sensitivity is relatively low so that the housing 14 should be moved through the bore hole at a lower velocity when a log is being made.

The detector 15 likewise may comprise a central anode 17 and a coaxial cathode 18 of substantially cylindrical shape disposed in an evacuated envelope containing gas at a suitable pressure. The detector 15, on the other hand, is made relatively long so that it will have sufficient sensitivity to enable a relatively less finely detailed log of the radioactivity of the formations surrounding the bore hole 11 to be obtained while the housing 14 is moved through the bore hole at a relatively high rate of speed.

According to the invention, the anode 19 of the detector 16 is connected in series with the anode 17 of the detector 15 by a conductor 21 and the detectors 15 and 16 are designed to have different starting potentials so that either one or both may be rendered effective to detect radioactivity by controlling the magnitude of the potential applied to the anode 17 of the detector 15. Control of the anode potential may be effected in any desired manner, as, for example, by grounding the cathodes 18 and 20 of the detectors 15 and 16, respectively, to the housing 14 by the conductors 22 and 23, respectively, and connecting the anode 17 of the detector 15 selectively to different taps on a suitable source of high potential D. C.

This may be accomplished by connecting the anode 17 through a conductor 24 and a suitable inductance 25 to the movable contact 26 of a relay 27, which is adapted to be moved selectively into engagement with either of two fixed contacts 28 and 29. The inductance 25 serves to keep the output pulses from the detectors 15 and 16 out of the D. C. supply. The fixed contacts 28 and 29 are connected to suitable taps 30 and 31, respectively, on a resistance 32, one end of which is grounded to the housing 14 at 33 and the other end of which is connected by a conductor 34 to the positive terminal of a conventional high potential D. C. power supply 35, preferably having a well regulated output.

The D. C. power supply 35 may be energized by 110 volt, 60 cycle A. C., for example, supplied by a suitable source 36 preferably located at the surface of the earth. One terminal of the source 36 may be grounded at 37 and its other terminal may be connected by a conductor 38 to an insulated conductor 39 in the supporting cable 12. The lower end of the conductor 39 is connected to the primary winding 40 of a transformer 41 mounted in the housing 14, the other terminal of which is grounded to the housing 14 at 42 through a condenser 43. The condenser 43 is connected in shunt with the winding of the relay 27 and it provides a low impedance path for A. C. of the supply frequency. One terminal of the secondary winding 44 of the transformer 41 is grounded to the housing at 45 and the other terminal is connected to one terminal of the D. C. power supply 35, the circuit being completed through a conductor 46 which is grounded to the casing 14 at 47.

Operation of the stepping relay 27 may be effected in any desired manner as, for example, by means of a switch 48 at the surface of the earth. The switch 48 has a movable contact 49 which may be moved selectively into engagement with either of two fixed contacts 50 and 51. The contact 50 is connected to one terminal of the A. C. source 36 while the contact 51 is connected to one terminal of a suitable source of D. C. 52, the other terminal of which is grounded at 53. With this construction, each time the switch contact 49 is moved into engagement with the contact 51, the relay 27 is energized and moves its contact 26 out of engagement with one of the contacts 28 or 29 and into engagement with the other. The next time D. C. is applied to the relay 27 by operation of the switch 48, the movable contact 26 on the relay 27 returns to its initial position.

The pulse output from the detectors 15 and 16 may be fed from the anode 17 of the detector 15 through a D. C. blocking condenser 54 and a conductor 55 to one terminal of a conventional pulse amplifier 56, another terminal of which is grounded to the housing 14 by a conductor 57. The amplifier 56 also receives D. C. power from the power supply 35 through a conductor 58 connected to a tap 59 on the resistor 32.

The output of the amplifier 56 is fed through a conductor 59, the conductor 39 in the supporting cable 12, a conductor 60 and a D. C. blocking condenser 61 to a second amplifier 62, the output of which may be supplied to a conventional recorder 63 which preferably records the outputs of the detectors 15 and 16 as a function of depth in the bore hole.

Preferably, a conventional low pass filter 64 should be interposed between the conductor 38 and the switch 48 for the purpose of keeping the relatively high frequency pulse output from the detectors 15 and 16 out of the electrical energy sources 36 and 52. Similarly, a conventional high pass filter 65 should preferably be interposed between the conductor 60 and the amplifier 62 for the purpose of keeping low frequency A. C. from the source 36 and D. C. from the source 52 out of the recording system.

The operation of the detecting apparatus will be more easily understood from the detector characteristic curves shown in Fig. 2. The solid curve 66 in Fig. 2 is a typical plot of the sensitivity of the detector 16 as a function of the potential applied to the anode 19 thereof, sensitivity being measured in units of "counts per minute." The dashed curve 67 is a plot of a typical sensitivity characteristic for the detector 15. It will be noted that the detector 16 is designed to have a lower starting potential than the detector 15 and, since the detector 16 is shorter, it is not as sensitive. However, being shorter, it is better able to give indications of relatively thin formations.

In order to produce a log of the output of the shorter detector 16, the switch 48 is manipulated to energize the relay 27, thereby moving its movable contact 26 out of engagement with the fixed contact 28 and into engagement with the lower potential contact 29. If the detectors 15 and 16 have characteristics as represented by the curves 67 and 66, respectively, in Fig. 2, the position of the tap 31 should be so chosen that approximately 910 volts will be applied to the anodes 17 and 19 of the detectors 15 and 16, respectively, when the switch contact 26 is in this position. This corresponds to the point 68 on the curve 66. Upon inspection of the curves 66 and 67 in Figs. 2, it will be apparent that, under these conditions, the detector 16 will be operative to detect radioactivity but the detector 15 will be inoperative. Therefore, if the housing 14 is moved relatively slowly through the bore hole 11, the recorder 63 will provide a radioactivity log which will distinguish thin formations traversed by the bore hole 11.

In order to obtain a less finely detailed log at a higher rate of speed, the switch 48 is again manipulated to move the movable stepping switch contact 26 out of engagement with the fixed contact 29 and into engagement with the contact 28 thereby applying a higher potential, say 970 volts, to the anodes 17 and 19 of the detectors 15 and 16, respectively. This corresponds to the points 69 and 70 on the curves 66 and 67, respectively, in Fig. 2. As can be seen from Fig. 2, under these conditions both detectors will be operative to detect radioactivity and the sensitivity of the system is greatly increased. Therefore, the logging apparatus may be run through the bore hole 11 at a substantially greater speed than when only the single short detector 16 is in use.

The desired difference in the starting potentials of the detectors 15 and 16 may be obtained in any known manner as by varying the pressure or the composition of the gas in each of the detectors as desired, for example. For more detailed information about detectors constructed so as to have different starting potentials, reference is made to an article entitled "The Factors Influencing the Plateau Characteristics of Self-Quenching Geiger-Mueller Counters" by W. D. B. Spatz, Physical Review, Volume 64, Numbers 7 and 8, October 1 and 15, 1943, pp. 236–240 inclusive.

The invention, therefore, provides a novel and a highly effective apparatus for detecting radioactivity. By designing the detectors so as to have different starting potentials and connecting their anodes in series, one or more of them may be brought into operation selectively, as desired, by proper adjustment of the anode voltage. This is highly advantageous in applications where the detecting apparatus is to be used in inaccessible places since it enables a plurality of detectors to be controlled without the necessity for running conductors or the like through any of the detectors.

It will be understood that the specific embodiment disclosed herein is susceptible of numerous modifications in form and detail within the scope of the invention. For example, other means than that shown may be employed for applying an adjustable direct current voltage to the anodes of the detector tubes, as will be apparent to those skilled in the art. Further, multiple-element detectors of the type shown in Patents Nos. 2,397,071 and 2,489,133, for example, may be employed instead of the simple illustrative forms of detectors described above. Also, the invention is not restricted to apparatus including only two detector tubes but may be applied with equal effectiveness to an apparatus comprising a plurality of tubes, one or more of which are to be rendered effective selectively to detect radioactivity. The specific embodiment described and shown in the accompanying drawing, therefore, is not to be regarded as limiting the scope of the appended claims.

I claim:

1. In radioactivity detecting apparatus, the combination of a plurality of radiation detectors, each having electrode means including anode means and cathode means and having different starting potentials, an energizing circuit having one terminal connected to the anode means of said detectors and another terminal connected to the cathode means of said detectors, a D. C. source interposed in said circuit and means facilitating adjustment of the amplitude of the potential of said source to values corresponding to said different starting potentials to render said detectors selectively operable.

2. In radioactivity detecting apparatus, the combination of a plurality of radiation detectors of different resolving powers, each having electrode means including anode means and cathode means and having different starting potentials, an energizing circuit having one terminal connected to the anode means of said detectors and another terminal connected to the cathode means of said detectors, a D. C. source interposed in said circuit and means facilitating adjustment of the amplitude of the potential of said source to values corresponding to said different starting potentials to render said dectectors selectively operable.

3. In apparatus for detecting radioactivity in relatively inaccessible locations, the combination of at least two radiation detectors adapted to be positioned in an inaccessible location, said detectors having different starting potentials and each having anode means and cathode means, an energizing circuit including the anode means of said detectors and an adjustable amplitude D. C. source in series, means for controlling the amplitude of the potential output of said D. C. source from a relatively remote observation position to provide potential outputs corresponding to said respective starting potentials to render one or both of said detectors operable to detect, and means at said observation position for exhibiting a function of the output of one or both of said detectors.

4. In apparatus for detecting radioactivity in a bore hole drilled into the earth, the combination of a housing adapted to be moved through a bore hole, at least two longitudinally spaced apart radiation detectors of different resolving powers in said housing, said detectors having different starting potentials correlated with their respective resolving power and each having anode means and cathode means, an energizing circuit including the anode means of said detectors and an adjustable amplitude D. C. source, control means at the surface of the earth for controlling the amplitude of the potential output of said D. C. source to provide potential outputs corresponding to said respective starting potentials to render one or both of said detectors operable to detect radioactivity, and means at the surface of the earth for exhibiting a function of the output of one or both of said detectors.

5. In apparatus for detecting radioactivity in a bore hole drilled into the earth, the combination of a housing adapted to be moved through a bore hole, at least two longitudinally spaced apart radiation detectors in said housing, said detectors having different starting potentials and each having anode means and cathode means, an energizing circuit including the anode means of said detectors and a D. C. source in series in said housing, electrical means in the housing for adjusting the amplitude of the output of said D. C. source to provide potential outputs corresponding to said respective starting potentials to render one or both of said detectors selectively operable to detect radioactivity, electrical circuit means connected to said electrical adjusting means and extending to the surface of the earth, and control means connected to said circuit means at the surface of the earth for controlling said adjusting means.

6. In apparatus for detecting radioactivity in a bore hole drilled into the earth, the combination of a housing adapted to be moved through a bore hole, at least two longitudinally spaced apart radiation detectors in said housing, said detectors having different starting potentials and each having anode means and cathode means, a source of D. C. in said housing, adjustable voltage divider means connected to said D. C. source, an energizing circuit including the anode means of said detectors and said voltage divider means in series, relay means in said housing for actuating said voltage divider means, circuit means including at least one conductor extending from said relay means to the surface of the earth, and control means interposed in said circuit means at the surface of the earth for controlling the operation of said relay means.

7. In apparatus for detecting radioactivity in a bore hole drilled into the earth, the combination of a housing adapted to be moved through a bore hole, at least two longitudinally spaced apart radiation detectors in said housing, said detectors having different starting potentials and each having anode means and cathode means, an A. C. energized source of D. C. in said housing, adjustable voltage divider means connected to said D. C. source, an energizing circuit including the anode means of said detectors and the voltage divider means in series, relay means for actuating said voltage divider means, circuit means including at least one conductor connected to the A. C. input side of said D. C. source and to said relay means, A. C. and D. C. sources disposed at the surface of the earth, and switching means for connecting said A. C. and D. C sources selectively in said circuit means.

8. In apparatus for detecting radioactivity in a bore drilled into the earth, the combination of a housing adapted to be moved through a bore hole, at least two longitudinally spaced apart radiation detectors in said housing, said detectors having different starting potentials and each having anode means and cathode means, an A. C. energized source of D. C. in said housing, adjustable voltage divider means connected to said D. C. source, an energizing circuit including the anode means of said detectors and the voltage divider means in series, relay means for actuating said voltage divider means, circuit means including at least one conductor connected to the A. C. input side of said D. C. source and to said relay means, means connected in shunt with said relay means and forming a low impedance path to A. C., A. C. and D. C. sources disposed at the surface of the earth, switching means for connecting said A. C. and D. C. sources selectively in said circuit means, amplifier means in the housing having input terminals connected to said detector anode means and cathode means, respectively, and having output terminals connected in said circuit means, first filter means for keeping periodically varying signals out of said voltage divider means and for keeping D. C. out of the input circuit of said amplifier means, recording means located at the surface of the earth, second amplifier means having input terminals connected to said circuit means at the surface of the earth and having output terminals connected to said recording means, low pass filter means interposed between said circuit means and said switching means at the surface of the earth, and high pass filter means interposed between said circuit means and said second amplifier means.

9. In radioactivity detecting apparatus, the combination of a plurality of radiation detectors having starting potentials in inverse relationship to their resolving powers, a source of adjustable direct potential, and an energizing circuit for applying the direct potential to all said detectors in parallel, whereby said detectors are rendered cumulatively operable with increasing applied potential, starting with the detector having the highest resolving power.

10. In radioactivity detecting apparatus, the combination of a plurality of radiation detectors having different resolving powers and different starting potentials, the lowest starting potential being associated with the detector having the highest resolving power, means for applying a direct potential simultaneously to all said detectors, and means for adjusting said potential whereby detectors of progressively lower resolving power are rendered successively operable with increasing applied potential.

References Cited in the file of this patent

UNITED STATES PATENTS

| Number | Name | Date |
|---|---|---|
| 2,378,408 | Herzog | June 19, 1945 |
| 2,391,093 | Howell | Dec. 18, 1945 |
| 2,474,581 | Howell | June 28, 1949 |
| 2,481,014 | Herzog | Sept. 6, 1949 |
| 2,508,772 | Pontecorvo | May 23, 1950 |